March 29, 1949.  A. W. ALLEN  2,465,703
AIRCRAFT SUSTAINING ROTOR
Filed Oct. 7, 1943  3 Sheets-Sheet 2
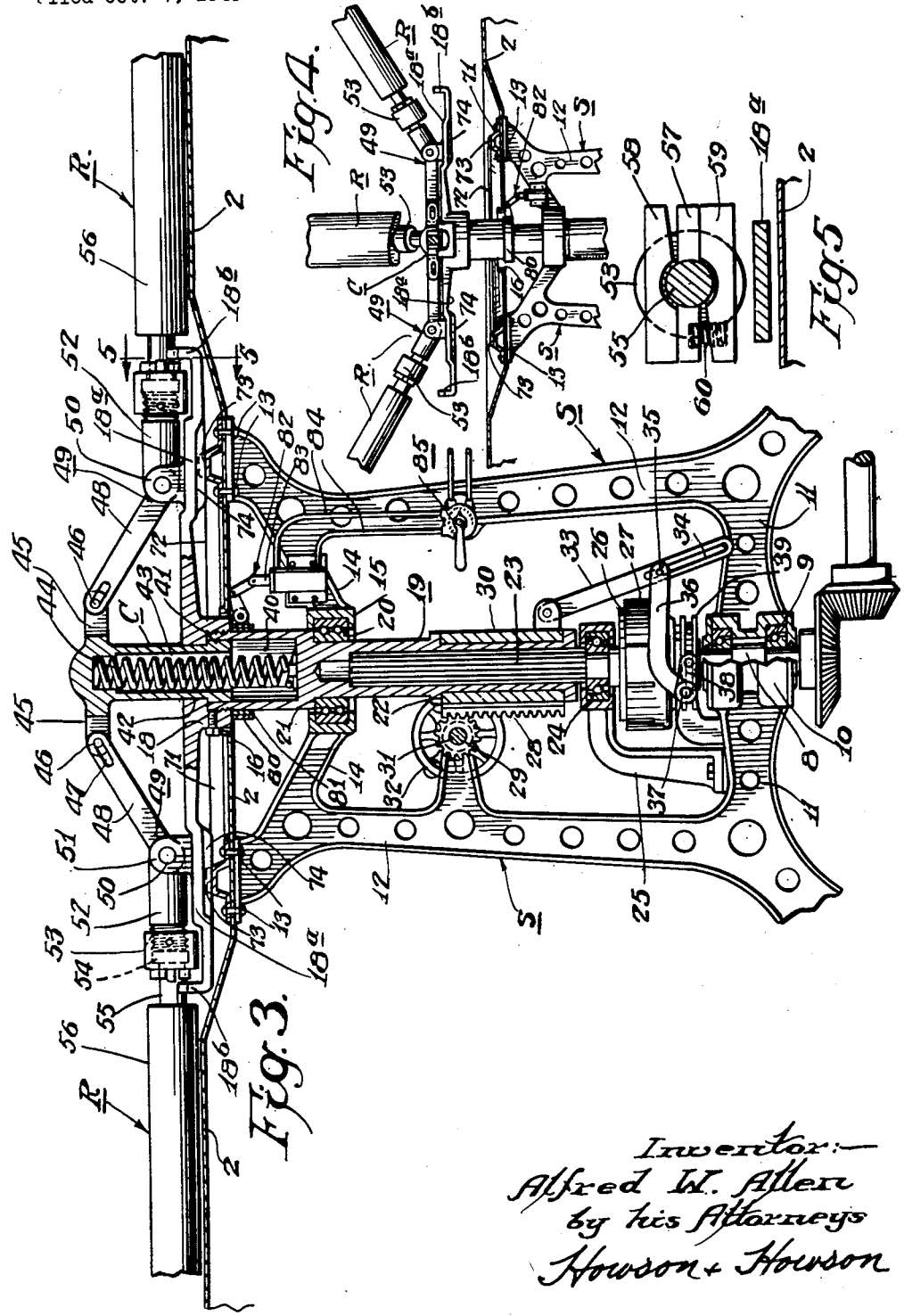
Inventor:—
Alfred W. Allen
by his Attorneys
Howson & Howson

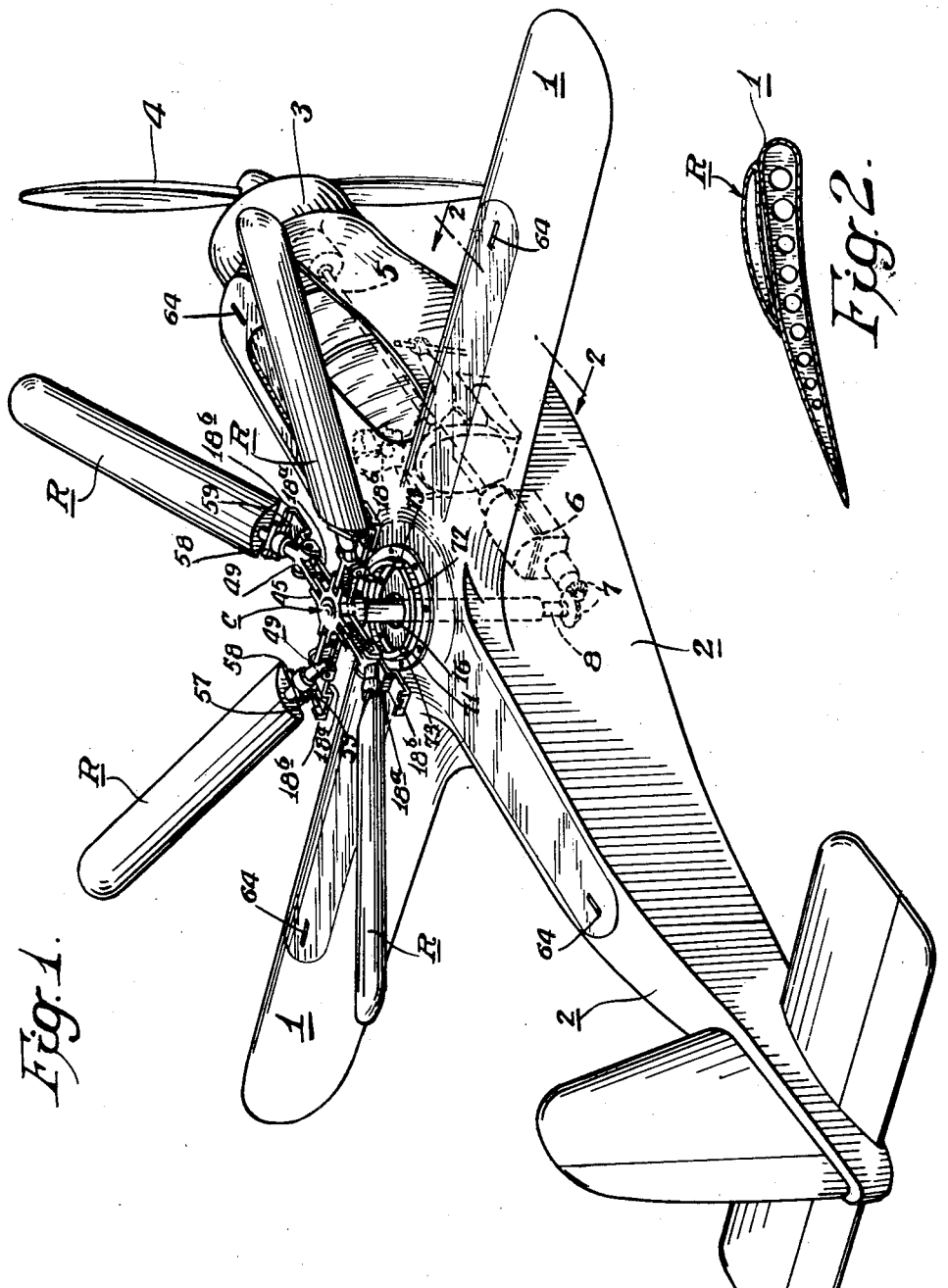

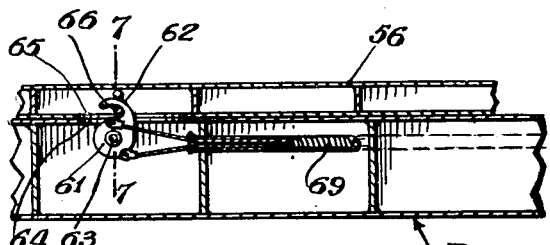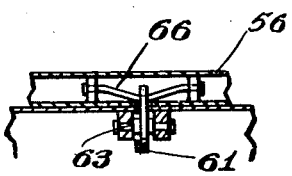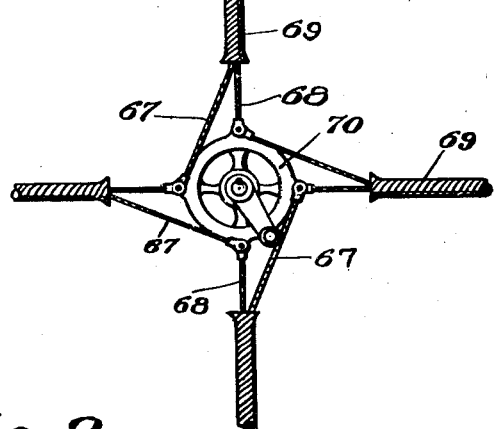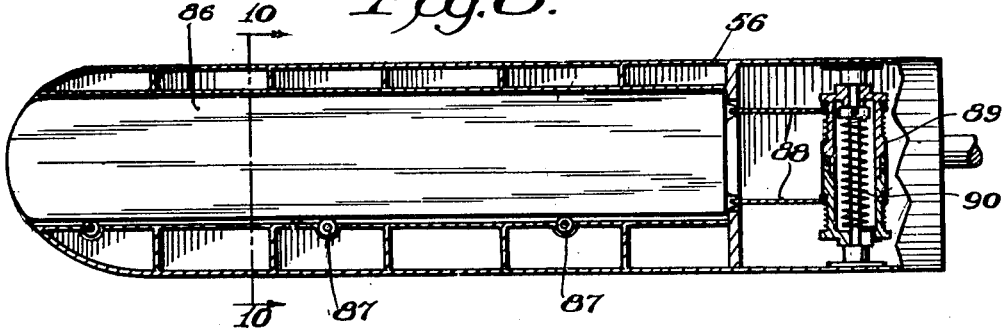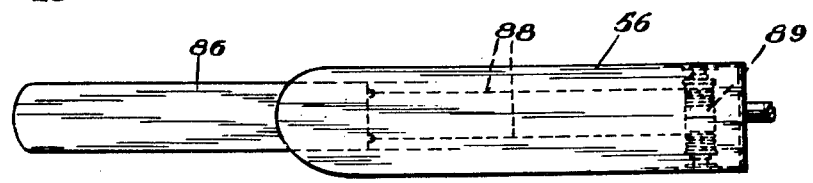

Patented Mar. 29, 1949

2,465,703

UNITED STATES PATENT OFFICE 2,465,703

AIRCRAFT SUSTAINING ROTOR

Alfred W. Allen, Philadelphia, Pa.

Application October 7, 1943, Serial No. 505,378

4 Claims. (Cl. 170—160.52)

This invention relates to aircraft of the heavier than air type.

The conventional type of heavier than air plane cannot land and take off within comparatively small areas due to the required landing and take-off speeds of such planes, and the present invention contemplates the provision of a plane of the conventional type which embodies a power driven rotor to permit the plane to take off and land within a small area while retaining all the attributes and advantages of a conventional type plane when in flight. However, in this type of aircraft, while the rotor device functions effectively during take-off and landing of the aircraft, difficulty is encountered in flight by reason of the fact that the rotor forms an obstruction to the wind and it is not possible to maintain an adequate maximum speed of flight commensurate with that of a similarly powered conventional fixed-wing airplane.

With the foregoing in mind, an object of the present invention is to provide an aircraft of the type described wherein the rotor is power driven and may be moved to an elevated operative position in the wind path above the fixed-wing, or to a lowered inoperative position out of the wind path, as desired.

Another object of the invention is to provide an aircraft of the character set forth having a multi-bladed rotor which is rotatable about a vertical axis and movable between an elevated operative position, and a lowered inoperative position in which said blades are complementarily associated with, and form a part of, the fixed-wing and fuselage surface portions of the aircraft thereby providing an efficient, unobstructed wind or slip-stream surface that will not retard forward speed of flight.

Another object of the invention is to provide an air craft of the stated type having means for braking, indexing and securing the rotor blades in predetermined proper relation with respect to the wing and fuselage portions of the aircraft when said rotor is moved to inoperative position.

A further object of the invention is to provide an aircraft of the type set forth which is constructed and arranged so that the rotor is automatically coupled and uncoupled to the aircraft motor or engine as said rotor is moved to and from its elevated operative position above the fixed-wing of the aircraft.

Still another object of the invention is to provide an aircraft embodying the stated features wherein the blades of the rotor may be extended or elongated longitudinally as desired to increase the effective surface area of said rotor.

These and other objects of the invention and the various features and details of construction and operation thereof are hereinafter fully set forth and described, and shown in the accompanying drawings, in which:

Figure 1 is a view in perspective of an aircraft embodying the present invention and showing the rotor thereof in elevated operative position.

Figure 2 is an enlarged view in section taken on line 2—2, Figure 1 but showing the rotor in lowered inoperative position with the blades thereon resting upon the wing and fuselage portions of the aircraft.

Figure 3 is an enlarged partial sectional view vertically and longitudinally through the body of the aircraft, showing the rotor in lowered inoperative position together with certain of the operating and control devices therefor.

Figure 4 is a smaller fragmentary view similar to Figure 3 showing the rotor in elevated operating position.

Figure 5 is an enlarged sectional view taken on line 5—5, Figure 3.

Figure 6 is a diagrammatic view partially in section showing the mechanism for securing the rotor blades in inoperative position relative to the fixed wing and fuselage portions of the aircraft.

Figure 7 is a sectional view taken on line 7—7, Figure 6.

Figure 8 is a sectional plan view showing a modification of the rotor blade construction embodying an extensible blade section telescopically associated therewith.

Figure 9 is a view in plan of a rotor blade showing the blade section in radially extended relation with respect to the main rotor blade; and Figure 10 is a sectional view taken on line 10—10, Figure 8.

Referring now more particularly to the drawings, the aircraft, as stated, is of the heavier than air type and preferably is of conventional construction comprising a fixed wing 1 disposed transversely of a fuselage 2 in the forward end or nose of which is mounted a suitable motor or engine 3, for example, of the radial type, driving the conventional propeller or air screw 4 mounted on the forward end of the engine shaft 5.

As shown in Figure 1, the engine shaft 5 extends rearwardly longitudinally within the fuselage 2 and connects through a reduction gear 6, of suitable ratio, and beveled gears 7 with the lower end of a vertically disposed drive shaft 8 which is journaled in suitable bearings 9 mounted in a sleeve or collar 10 formed centrally of the lower arm portions 11 of a supporting frame structure designated generally as S.

This supporting frame S comprises substantially vertically extending relatively spaced strut portions 12, the upper ends of which are secured to the underside of the top or roof of the fuselage 2 as indicated at 13. Adjacent the upper ends of the strut portions 12 of said supporting structure S, there is provided a pair of inwardly extending arm portions 14 and these terminate centrally in a sleeve or collar member 15 disposed coaxially with respect to the aforesaid sleeve or collar 10 of the support lower arm portions 11.

In axial alignment with the sleeves or collars 10 and 15, previously described, there is provided in the top or roof of the fuselage 2 a circular opening 16 which freely receives the central hub member 18 of a rotor assembly designated generally as R and best shown in Figure 3 of the drawings. Secured within the hub member 18 is the upper end of a sleeve member 19 which is rotatably and slidably mounted in a suitable bearing 20, secured within the aforesaid sleeve or collar 15, for vertical sliding movement relative to said bearing 20. This sliding movement of sleeve 19 is positively limited to a lowermost position by a shoulder 21 formed thereon above the bearing 20 and in its uppermost or elevated position by a shoulder 22 similarly formed thereon below the bearing 20, the spacing of said shoulders 21 and 22 longitudinally of the sleeve member 19 determining the limits of vertical sliding movement of that member.

The lower end portion of the sleeve member 19 is slidably mounted upon a spline shaft 23 which is rotatably supported adjacent its lower end in a bearing 24 carried by an arm 25 of inverted L-shape supported from the structure S. At its lower end the spline shaft 23 connects with the driven member 26 of a suitable clutch mechanism, the driving member 27 of which is secured upon the drive shaft 8, previously described, so that upon engagement of the clutch members 26 and 27 the drive shaft 8 will operate rotationally to drive the spline shaft 23 and sleeve member 19 from the motor or engine 3 at the forward end or nose of the aircraft through the reduction gear 6 and gears 7, aforesaid.

Vertical sliding movement of the sleeve member 19 relative to the spline shaft 23 and the wing and fuselage structure of the aircraft is accomplished by means of a suitable rack and pinion 28 and 29, respectively, the former being provided upon a collar 30 secured externally of the sleeve member 19 and the latter being fixed upon a shaft 31 which is rotated by a suitable hand wheel 32. Engagement and disengagement of the clutch members 26 and 27 preferably is accomplished automatically by raising and lowering the sleeve member 19 through operation of the hand wheel 32 as aforesaid. To this end the collar 30 on the sleeve member 19 has connected thereto one end of a link 33 in the other end portion of which there is provided a longitudinally elongated slot 34. Within this slot 34 there moves a pin 35 carried by the free end of a link 36, the other end of which is connected as at 37 to an arm 38 which is in turn connected to a clutch ring 39 associated with the driving clutch member 27.

By this construction it will be seen that as the sleeve member 19 is elevated through operation of the hand wheel 32 and approaches its full elevated position the link 33 will cause the link 36 to be moved in a counterclockwise direction, with respect to Figure 3, thereby actuating the link 38 and clutch ring 39 to move the driving clutch member 27 upwardly into driving engagement with the driven clutch member 26. Similarly, as the sleeve member 19 is lowered from its elevated position the links 33 and 36 will be actuated in the reverse manner to disengage the driving clutch member 27 from the driven clutch member 26.

As previously stated, the upper end of the sleeve member 19 is fixedly secured to the central hub portion 18 of the rotor R and, as shown in Figure 3 of the drawings, said upper end portion of the sleeve 19 is provided with an axial recess 40 which slidably receives the lower end of the stem portion 41 of a generally T-shaped cap member C, said member C also being slidably mounted with respect to the rotor hub member 18 through an opening 42 located centrally therein. In the lowered position of the sleeve 19, shown in Figure 3 of the drawings, the cap C projects some distance above the rotor hub member 18, and the stem 41 of said cap C is provided with a bottom opening bore or recess 43 communicating with the recess or bore 40 in the upper end of said sleeve member 19. A spring 44 is mounted as shown within these recesses 40 and 43 of the sleeve member 19 and cap C, respectively, and this spring member 44 is of the expansion type and normally biases the said cap C into the relative position shown in Figure 3 of the drawings with respect to the rotor hub member 18.

From the foregoing it will be seen, therefore, that when the hand wheel 32 is rotated to elevate the sleeve member 19, the latter will carry with it upwardly the rotor hub member 18 and the cap C, the latter being carried along by reason of the expansion force of the spring 44 aforesaid.

Projecting radially from the head of the cap C at 90° spaced intervals are pairs of spaced ears 45 between each of which extends a pin 46. Slidably and pivotally mounted on each such pin 46, by reason of a slot 47, is one arm 48 of the bell crank 49 which also is pivotally mounted, as indicated at 50, to lugs 51 formed on arms 18a which extend radially outward from the rotor hub member 18 at correspondingly spaced intervals. The outer ends of the other arms 52 of the bell cranks 49 have threaded thereon a collar 53 in which is rotatably retained the enlarged end portion 54 of shaft 55 on which is fixed a rotor blade 56. Rotation of rotor blade 56 and its shaft 55 relative to the collar 53 and the bell crank 49 is limited by means of a lug 57 on the rotor blade shaft 55 and movable therewith between suitably spaced stops 58, 59, respectively, formed on the outer face of the collar 53, for example, as shown in Figure 5 of the drawings. Disposed between the stop 59 and the lug 57 on the rotor blade shaft 55 is a spring 60 which functions in cooperation with said stops normally to maintain the blade 56 and its shaft 55 in horizontal position, the stops 58 and 59 being constructed and arranged with respect to each other and the lug 57 to permit limited rotation of said shaft 55 and blade 56 in a counterclockwise direction, with respect to Figure 5, so that the leading edge of the blade 56 will climb into the wind thereby providing an increased angle of blade attack during rotation of the rotor R. In the present instance this angular rotation of the rotor blades 56 from the horizontal to an inclined attack angle preferably is limited to an angle of approximately 5°. The rotor hub mechanism, including cap C, bell crank 49, etc., may be provided with a protective covering or hood in the nature of a streamlined cowling member or the like which is secured to the hub structure and rotatable with the latter and the rotor R.

In inoperative or lowered position of the sleeve 19 and rotor hub member 18, the blades 56 are disposed in the horizontal position shown in Figure 3 of the drawings and rest upon the top surfaces of the fixed wing and fuselage portions 1 and 2, respectively, of the aircraft in which said blades form a part of and are complementarily associated with the fixed wing and fuselage portions thereof. With the blades 56 in horizontal position the shafts 55 thereof, and some of the weight of the blades, are supported by the upturned ends 18b of the radially projecting arm portions 18a of the rotor hub member 18, and these upturned end portions 18b may be notched as indicated.

When the rotor blades 56 are in the lowered inoperative position shown in Figure 3, in overlying contact with, and forming a part of, the wing and fuselage portions of the aircraft, means preferably is provided for locking or securing said blades 56 to the surfaces of the wing and fuselage. As shown in Figures 1, 6 and 7 of the drawings, this may take the form of rotatably mounted latch members 61 having hook or finger portions 62, the said members 61 being pivotally mounted as at 63 within the wing and fuselage respectively so that upon rotation of said members 61 the hook or finger portions 62 thereof move upwardly and out of the wing and fuselage through slot 64 therein and through corresponding slots 65 in the underside of the rotor blades 56 where they engage over a cross-pin or like member 66, the said cross-pins 66 being of generally V-shape, as shown in Figure 7, to insure proper centering of the latch fingers 62 relative thereto.

Actuation of the rotatable latch members 61 about their pivots 63 may be accomplished in any suitable manner, for example, by means of pairs of flexible cables 67 and 68, respectively. These may be contained within suitable flexible conduits 69 which lead from the latch members 61 through the wing and fuselage to the operating area of the latter where they are connected to a suitable hand wheel 70 in such manner that rotation in one direction will operate to exert a drawing force on the cables 67 to rotate the latch members 61 in one direction thus moving the fingers 62 into engagement with the pins 66 and in the opposite direction to exert a pull on cables 68 causing a clockwise rotation of latch members 61 to disengage the fingers 62 from the pins 66 thereby releasing rotor blades 56 so that they can be elevated into operative position by upward actuation of the sleeve 19.

For the purpose of indexing and properly locating the rotor blades with respect to the wing and fuselage portions of the aircraft as the rotor is lowered into its inoperative position, there is secured upon the top of the fuselage and immediately subjacent the path of rotational movement of the radial arms 18a of the rotor hub member 18 when in lowered position, an annular, or ring, member 71 comprising a raised annular central portion 72 the upper surface of which is notched or recessed as at 73. These notches or recesses 73 are spaced apart at 90° intervals and are positioned as shown in Figure 1 of the drawings, to correspond with the proper rotor blade positions when in inoperative position resting upon the upper surfaces of the fuselage and wing portions of the aircraft. The said notches or recesses 73 are adapted to be engaged by suitable ribs 74 formed on the underside of the arms 18a of the rotor hub member 18 as the latter and the blades, upon being lowered, reach their full lowered position thereby indexing and properly locating the rotor blades 56 with respect to the top surfaces of the fuselage and wing portions of the aircraft and in which position they may be secured by means of the latch members 61 previously described.

For the purpose of retarding, and if necessary stopping, rotation of the rotor R as it is lowered into inoperative position after disengagement of the clutch members 26 and 27 as previously described, a suitable brake mechanism preferably is provided. As shown in Figure 3 of the drawings, this may take the form of a suitable brake drum 80 fixed externally of the sleeve member 19 in cooperative association with which is a brake band 81 operable through a suitable toggle linkage 82 by a suitable piston 83 under pneumatic or hydraulic power supplied by pipes 84 and regulated or controlled by a suitable valve 85.

In operation, and assuming that the aircraft is resting upon the ground with the sleeve member 19 lowered and the rotor inoperative with its blades 56 resting upon and secured to the fuselage and wing portions of the aircraft as previously described, the motor 3 is started and, of course, rotating with the motor is the conventional propeller or air screw 4. Assuming the pilot now wishes to take off on a flight, the rotor wings 56 are first released by rotating the hand wheel 70 in the proper direction to cause cables 68 to rotate the latch members 61 and disengage them from the pins 66 in the rotor blades. The pilot then operates valve 85 to release the brakes 80, 81 and the hand wheel 32 is then actuated to elevate the sleeve member 19 and the rotor assembly R, including the hub member 18, cap C and rotor blades 56. In the course of this, and as the sleeve member 19 approaches its full elevated position, the clutch members 26 and 27 will be brought into engagement by operation of the link 33 thereby rotationally driving the spline shaft 23, the sleeve member 19 and the rotor assembly R supported thereby. At this point the rotor blades 56 still will tend to remain in a horizontal position by reason of the bias of the spring 44. The engine or motor 3 is now accelerated to proper take-off speed thereby increasing the speed of rotation of the propeller and of the rotor assembly R and, as rotation of the said rotor increases, the reaction between the blades 56 and the wind causes the said blades to pivot upwardly and increase their angle of attack to the extent permitted by the stop 58. This increased angle of blade attack exerts a lifting action on the blades 56 causing them to pivot upwardly about the pivot 50 to the inclined position shown in Figure 4 against the force of the spring 44 which is compressed by downward movement of the cap C effected by the bell cranks 49.

The plane now takes off under the dual effect of the propeller 4 and the power driven rotor assembly R, the latter rotating at a speed which is materially slower than the speed of rotation of the propeller 4 by reason of the reduction gear 6. When the aircraft has reached the ceiling at which rapid forward flight is desired, the pilot may lower the rotor assembly R by operating the hand wheel 32, and as the sleeve 19 moves downwardly the clutch members 26 and 27 are disengaged thereby causing a decreasing wind reaction upon the blades with the result that the spring 44 will cause said blades 56 to assume a horizontal position, and as the rotor assembly approaches its lowermost inoperative position the brake mechanism 80, 81 may be applied to substantially stop rotation of said rotor so that as it reaches its full lowered position the ribs 74 on the underside of the radial arms 18a of the rotor hub member 18 will engage the notches or recesses 73 in the ring member 70 thereby indexing and properly positioning the rotor blades 56 with respect to the wing and fuselage portions of the aircraft. The blades 56 thereupon may be secured in position by the latch mechanisms 61, and forward flight of the aircraft solely by means of the conventional airscrew or propeller 4 may continue as in the conventional airplane and without the obstruction and hindrance that otherwise would be afforded by the rotor assembly in raised position.

When it is desired to land the aircraft, the rotor R again may be put into operation in the manner previously described, thus enabling the plane to land with less forward speed and in a substantially smaller area than otherwise possible, and the rotor assembly then actuated to its lowered inoperative position and secured by the latches 61.

It will be understood, of course, that in addition to use of the power driven rotor R for take off and landing purposes, it can be employed at will while the plane is in the air to effect changes in flight elevation and to provide a slower speed of flight or permit the aircraft substantially to hover over a particular site or location.

In certain types of aircraft and depending upon the conditions of use to which such craft may be put, it may be desirable to provide for extension or elongation of the rotor blades to increase the effective lift surface thereof. This may be accomplished, for example, as shown in Figures 8, 9 and 10 of the drawings, by providing extensible blade sections 86 of reduced cross-sectional area adapted to telescope endwise or longitudinally within the main rotor blades 56. For this purpose, suitable rollers 87 may be provided in the blades 56 for the purpose of minimizing friction between the extensible blade section 86 and the blade 56. The extensible blade section 86 normally is retained within the blade 56 by means of cables 88 wound upon a drum 89 which is provided internally thereof with a spring 90 arranged normally to urge the drum 89 in a direction tending to wind said cables 88 thereon and retain the blade section 86 within blade 56, it being contemplated that extension of the blade sections 86 outwardly of the blades 56 will be accomplished by the generation of centrifugal force on said blade sections 86 sufficient to overcome the winding-up action of the springs 90 on the drums 89 which tend to hold said blade sections 86 within the blades 56.

From the foregoing it will be observed that the present invention provides a heavier than air craft of conventional type having associated therewith a power driven rotor which is movable to an elevated operative position in the wind path above the fixed wing of the craft, or to a lower inoperative position upon the surface of the wing and fuselage of the craft out of their wind path. Too, the invention provides novel mechanisms for indexing and securing the rotor blades in their predetermined proper relation with respect to the wing and fuselage portions of the aircraft when the rotor is in the inoperative position. Also, the invention provides a novel construction and arrangement of parts whereby the rotor mechanism is automatically coupled and uncoupled to the conventional aircraft motor or engine as the rotor is moved respectively to and from its elevated operative position. Finally, the invention provides an aircraft construction embodying the features aforesaid wherein the blades of the rotor may be extended or elongated longitudinally to increase the effective surface area of the rotor.

While a particular embodiment of the several features of the invention have herein been shown and described, it is not intended that the invention be limited to such disclosure but that changes and modifications and improvements may be made therein and thereto within the scope of the claims.

I claim:

1. A rotor assembly for aircraft comprising a rotatable hub member, a rotatable cap member extending coaxially of said hub member and slidable vertically with respect thereto between upper and lower limits, a plurality of radially extending blades, and a bell crank pivotally connecting each of said blades to said hub and cap members constructed and arranged so that when said cap member is at the upper limit of its movement with respect to said hub member the blades are disposed in a substantially horizontal plane and when said cap member is at the lower limit of its movement with respect to the hub member said blades are inclined outwardly at an acute angle with respect to said hub member.

2. A rotor assembly for aircraft comprising a rotatable hub member, a rotatable cap member extending coaxially of said hub member and slidable vertically with respect thereto between upper and lower limits, a plurality of radially extending blades, a bell crank pivotally connecting each of said blades to said hub and cap members constructed and arranged so that when said cap member is at the upper limit of its movement with respect to said hub member the blades are disposed in a substantially horizontal plan and when said cap member is at the lower limit of its movement with respect to the hub member said blades are inclined outwardly at an acute angle with respect to said hub member, and spring means normally biasing said cap member to the limit of its upward movement with respect to said hub member and opposing angular inclination of said blades.

3. A rotor assembly for aircraft comprising a rotatable hub member, a rotatable cap member extending coaxially of said hub member and slidable vertically with respect thereto between upper and lower limits, a plurality of radially extending blades, a bell crank pivotally connecting each of said blades to said hub and cap members constructed and arranged so that when said cap member is at the upper limit of its movement with respect to said hub member the blades are disposed in a substantially horizontal plane and when said cap member is at the lower limit of its movement with respect to the hub member said blades are inclined outwardly at an acute angle with respect to said hub member, spring means normally biasing said cap member to the limit of its upward movement with respect to said hub member and opposing angular inclination of said blades, and the construction and arrangement of each of said radially extending blades being such that upon rotation thereof with the hub member, the aerodynamic reaction upon the blades causes the same to pivot upwardly to said radially inclined position thereof thereby actuating said cap member downwardly with respect to the hub member against the bias of said spring.

4. A rotor assembly for aircraft comprising a rotatable hub member, a rotatable cap member extending coaxially of said hub member and slidable vertically with respect thereto between upper and lower limits, a plurality of radially extending elongated blades, means supporting said blades for rotational movement about their longitudinal axes and pivotally connecting said blades to said hub and cap members for substantially vertical swinging movement with respect thereto, said means being constructed and arranged so that when said cap member is at the upper limit of its movement with respect to said hub member the blades are pivoted to a substantially horizontal position and when said cap member is at the lower limit of its movement with respect to the hub member said blades are pivoted to an inclined position at an acute angle with respect to said hub member, intercooperating stop means carried by said blades and said means supporting the blades operable to limit rotational movement of said blades about their axes between one position in which the blades are rotationally horizontal and an angular position in which the leading edges of the blades are inclined with respect to the horizontal, and spring means interposed between said intercooperating stop means operable normally to maintain said blades in the rotationally horizontal limit position provided by said stop means.

ALFRED W. ALLEN.

REFERENCES CITED

The following references are of record in the file of this patent:

UNITED STATES PATENTS

| Number | Name | Date |
|---|---|---|
| 1,616,123 | Hicklin | Feb. 1, 1927 |
| 1,793,651 | Thorsen | Feb. 24, 1931 |
| 1,904,923 | MacCaskie | Apr. 18, 1933 |
| 1,922,866 | Rosenberg et al. | Aug. 15, 1933 |
| 2,008,843 | Smith | July 23, 1935 |
| 2,021,470 | Upson | Nov. 19, 1935 |
| 2,094,105 | Myers | Sept. 28, 1937 |
| 2,108,245 | Ash | Feb. 15, 1938 |
| 2,110,563 | Thaon | Mar. 8, 1938 |
| 2,216,163 | Ray | Oct. 1, 1940 |